United States Patent Office

Re. 28,258

Reissued Dec. 3, 1974

28,258

DIRECT POSITIVE SILVER HALIDE EMULSIONS CONTAINING HALOGENATED DERIVATIVES OF CYANINE DYES

Paul B. Gilman, Rochester, N.Y., Roberta A. Litzerman, Brighton, Mass, and Bernard D. Illingsworth, deceased, late of Rochester, N.Y., by Mary D. Clark, executrix, Rochester, N.Y., assignors to Eastman Kodak Company, Rochester, N.Y.

No Drawing. Original No. 3,501,309, dated Mar. 17, 1970, Ser. No. 609,734, Jan. 17, 1967, which is a continuation-in-part of abandoned application Ser. No. 533,458, Mar. 11, 1966. Application for reissue Mar. 16, 1972, Ser. No. 235,394

Int. Cl. G03c *1/36*

U.S. Cl. 96—101 24 Claims

Matter enclosed in heavy brackets [ ] appears in the original patent but forms no part of this reissue specification; matter printed in italics indicates the additions made by reissue.

ABSTRACT OF THE DISCLOSURE

Halogenated *derivatives of* cyanine dyes are incorporated in direct positive emulsions as electron acceptors.

This application is a continuation-in-part of our U.S. patent application Ser. No. 533,458, filed Mar. 11, 1966, now abandoned.

This invention relates to photographic emulsions, and more particularly to novel emulsions featuring certain electron acceptors.

Various compounds have been suggested as electron acceptors for photographic silver halide emulsions. It is desirable to incorporate electron acceptors in certain emulsions, such as fogged emulsions, to provide direct positive images. In this invention, novel emulsions are provided which feature a class of especially effective electron acceptors. One of the features of the electron acceptors employed in this invention is that they may be used alone or in combination with spectral sensitizing dyes to extend the response of direct positive emulsions to radiation having a wave length longer than about 480 mμ. Another feature of these electron acceptors is that they may be effectively used in fogged emulsions to provide direct positive images of especially good quality, particularly with respect to the absence of any negative image in the areas of high exposure.

One object of this invention is to provide novel photographic emulsions containing certain highly effective electron acceptors. Another object of this invention is to provide novel, direct positive emulsions featuring a certain class of electron acceptors which may be used with spectral sensitizing dyes. Still another object of this invention is to provide novel, direct positive emulsions containing certain electron acceptors, which emulsions produce images essentially free of density in areas of high exposure. These and other objects of this invention will be apparent from this disclosure and the appended claims.

In one embodiment of this invention, silver halide emulsions are provided which feature, as electron acceptor, a cyanine dye *derivative in which at least one terminal methine group of the cyanine dye is halogenated with chlorine, bromine or iodine.* [having at least one methine group wherein a hydrogen atom thereof is replaced with a halogen atom selected from the group consisting of chlorine, bromine and iodine. A carbon atom linking the two nuclei of the dye can carry one or two halogen atoms.] An especially useful class of electron acceptors [has] *are halogenated derivatives of cyanine dyes having* the following general formula:

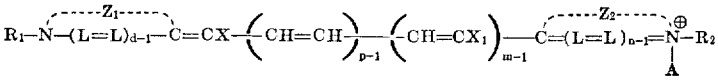

wherein $Z_1$ and $Z_2$ each represents the non-metallic atoms necessary to complete a heterocyclic nucleus of the type used in cyanine dyes, such as a nucleus containing 5 to 6 atoms, and which may include a hetero atom selected from the group consisting of oxygen, sulfur, nitrogen and selenium, e.g., a nucleus of the benzothiazole series (e.g., benzothiazole, 4-chlorobenzothiazole, 5-chlorobenzothiazole, 7-chlorobenzothiazole, 4-methylbenzothiazole, 5-methylbenzothiazole, 5-bromobenzothiazole, 4-phenylbenzothiazole, 5-phenylbenzothiazole, 6-phenylbenzothiazole, 4-methoxybenzothiazole, 5-methoxybenzothiazole, 5-iodobenzothiazole, 4-ethoxybenzothiazole, 5-ethoxybenzothiazole, 5-hydroxybenzothiazole, etc.); the naphthothiazole series (e.g. α-naphthothiazole, β-naphthothiazole, 5-methoxy-β-naphthothiazole, 5-ethyl-β-naphthothiazole, 8-methoxy-α-naphthothiazole, 7-methoxy - α - naphthothiazole, etc.); those of the benzoxazole series (e.g., benzoxazole, 5-chlorobenzoxazole, 5-methylbenzoxazole, 5-phenylbenzoxazole, 5-methoxybenzoxazole, 5-ethoxybenzoxazole, 5-hydroxybenzoxazole, etc.); those of the naphthoxazole series (e.g., α-naphthoxazole, β-naphthoxazole, etc.); those of the benzoselenazole series (e.g., benzoselenazole, 5-chlorobenzoselenazole, 5 - methylbenzoselenazole 5-hydroxybenzoselenazole, etc.); those of the naphthoselenazole series (e.g., α-naphthoselenazole, β-naphthoselenazole, etc.); those of the quinoline series including the 2-quinolines (e.g., quinoline, 3-methylquinoline, 5-methylquinoline, 7-methylquinoline, 8-methylquinoline, 6-chloroquinoline, 8-chloroquinoline, 6-methoxyquinoline, 6-hydroxyquinoline, 8-hydroxyquinoline, etc.); the 4-quinoline (e.g., quinoline, 6-methoxyquinoline, 7-methoxyquinoline, 8-methoxyquinoline, etc.); those of the isoquinoline series (e.g., the 1-isoquinolines, the 3-isoquinolines, etc.); L represents a methine group (substituted or unsubstituted, e.g. =CH—, =$CCH_3$—, etc.); X and $X_1$ each represents [an atom selected from the group consisting of] hydrogen, [, chlorine, bromine and iodine, at least one of X and $X_1$ being chlorine, bromine or iodine]; $R_1$ and $R_2$ each represents an alkyl substituent, e.g., a lower alkyl group such as methyl, ethyl, propyl, isopropyl, butyl, secondary butyl, tertiary butyl, etc., a sulfoalkyl group in which the alkyl group has from 1 to 4 carbon atoms, such as sulfomethyl, sulfoethyl, sulfopropyl, sulfobutyl, etc., and a carboxyalkyl group in which the alkyl group has from 1 to 4 carbon atoms such as carboxymethyl, carboxyethyl, carboxypropyl, carboxybutyl, etc.; A represents an acid anion such as chloride, bromide, iodide, p-toluenesulfonate, thiocyanate, methyl sulfate, ethyl sulfate, perchlorate, and the like; and d, m, n and p each represents a positive integer of from 1 to 2.

Advantageously, the novel emulsions of this invention which feature the special electron acceptors described above are fogged, direct positive emulsions. The fogging may be accomplished in any convenient manner, such as with a light exposure or using various chemicals. In a preferred embodiment, the emulsions are fogged with reducing agent and a compound of a metal more electropositive than silver.

In another embodiment of this invention, the *halogenated* dyes described above are added to an emulsion which comprises silver halide grains having a central core of a water-insoluble silver salt containing centers which promote the deposition of phototolytic silver, and an outer shell covering said core comprising a fogged water-insoluble silver salt that develops to silver without exposure.

The electron acceptors employed in this invention may be prepared by halogenating a cyanine dye with chlorine, bromine or iodine. Any suitable halogenating agent may be used, such as aqueous alcoholic (e.g., methanol or ethanol) solutions of the halogen, N-chlorosuccinimide, N-bromosuccinimide, N-iodosuccinimide, or a commercially available halogen-pyrrolidone complex, such as the bromine-pyrrolidone complex sold by General Aniline and Film Corp. [Using such halogenating agents causes replacement by halogen of a hydrogen atom in the methine chain.] In carbocyanines, or dicarbocyanines, it is probable that [halogen substitution] *halogenation* occurs on the terminal carbon atoms of the methine chain.

In accordance with one aspect of the invention, novel and improved direct positive photographic silver halide emulsions are prepared by incorporating one or more of the *halogenated* cyanine dyes of the invention into a suitable fogged silver halide emulsion. The emulsion can be fogged in any suitable manner, such as by light or with chemical fogging agents, e.g., stannous chloride, formaldehyde, thiourea dioxide and the like. The emulsion may be fogged by the addition thereto of a reducing agent such as thiourea dioxide and a compound of a metal more electropositive than silver such as a gold salt, for example, potassium chloroaurate, as described in British Patent 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl) phosphonium chloride, and the like. Typical useful metal compounds, that are more electropositive than silver include gold, rhodium, platinum, palladium, iridium, etc., preferably in the form of soluble salts thereof, e.g., potassium chloroaurate, auric chloride $(NH_4)_2PdCl$ and the like.

Useful concentrations of reducing agent and metal compound (e.g., metal salt) can be varied over a considerable range. As a general guideline, good results are obtained using about .05 to 40 mg. reducing agent per mole of silver halide, and 0.5 to 15.0 mg. metal compound per mole of silver halide. Best results are obtained at lower concentration levels of both reducing agent and metal compound.

The concentration of added *halogenated* dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in developer Kodak DK-50 having the composition set forth below, when the emulsion is coated at a silver coverage of 50 mg. to 500 mg. per square foot.

DEVELOPER

| | G. |
|---|---|
| N-methyl-p-aminophenol sulfate | 2.5 |
| Sodium sulfite (anhydrous) | 30.0 |
| Hydroquinone | 2.5 |
| Sodium metaborate | 10.0 |
| Potassium bromide | 0.5 |

Water to make 1.0 liter.

The *halogenated* dyes of this invention are also advantageously incorporated in direct positive emulsions of the type in which a silver halide grain has a water-insoluble silver salt center and an outer shell composed of a fogged water-insoluble silver salt that develops to silver without exposure. The *halogenated* dyes of the invention are incorporated, preferably in the outer shell of such emulsions. These emulsions can be prepared in various ways, such as those described in Berriman U.S. patent application Ser. No. 448,467, filed Apr. 15, 1965, now U.S. Patent No. 3,367,778. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

DEVELOPER A

| | G. |
|---|---|
| N-methyl-p-aminophenol sulfate | 2.5 |
| Ascorbic acid | 10.0 |
| Potassium metaborate | 35.0 |
| Potassium bromide | 1.0 |

Water to make 1 liter.
pH of 9.6.

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Saubeneir in Science et Industries Photographiques, vol. XXVIII, January 1957, pages 1 to 23 and Jaunary 1957, pages 57 to 65 are particularly useful. Such chemical sensitization includes three major classes, namely, gold or noble metal sensitization, sulfur sensitization, such as by a labile sulfur compound, and reduction sensitization, e.g., treatment of the silver halide with a strong reducing agent which introduces small specks of metallic silver into the silver salt crystal or grain.

The *halogenated* dyes of this invention are highly useful electron acceptors in high speed direct positive emulsions comprising fogged silver halide grains and a compound which accepts electrons, as described and claimed in Illingsworth U.S. patent application Ser. No. 609,794 filed Jan. 17, 1967 now abandoned and continuation-in-part Ser. No. 619,936 filed Mar. 2, 1967 and titled "Photographic Reversal Materials III." The fogged silver halide grains of such emulsions are such that a test portion thereof, when coated as a photographic silver halide emulsion on a support to give a maximum density of at least about one upon processing for six minutes at about 68° F. in Kodak DK-50 developer, has a maximum density which is at least about 30% greater than the maximum density of an identical coated test portion which is processed for six minutes at about 68° F. in Kodak DK-50 developer after being bleached for about 10 minutes at about 68° F. in a bleach composition of:

| | | |
|---|---|---|
| Potassium cyanide | mg. | 50 |
| Acetic acid (glacial) | cc. | 3.47 |
| Sodium acetate | g. | 11.49 |
| Potassium bromide | mg. | 119 |

Water to make 1 liter.

The grains of such emulsions will lose at least about 25% and generally at least about 40% of their fog when bleached for ten minutes at 68° F. in a potassium cyanide bleach composition as described herein. This fog loss can be illustrated by coating the silver halide grains as a photographic silver halide emulsion on a support to give a maximum density of at least 1.0 upon processing for six minutes at about 68° F. in Kodak DK–50 developer and comparing the density of such a coating with an identical coating which is processed for six minutes at 68° F. in Kodak DK–50 developer after being bleached for about 10 minutes at 68° F. in the potassium cyanide bleach composition. As already indicated, the maximum density of the unbleached coating will be at least 30% greater, generally at least 60% greater, than the maximum density of the bleached coating.

The silver halides employed in the preparation of the photographic emulsions useful herein include any of the photographic silver halides as exemplified by silver bromide, silver iodide, silver chloride, silver chlorobromide, silver bromoiodide, silver chlorobromide, and the like. Silver halide grains having an average grain size less than about one micron, preferably less than about 0.5 micron, give particularly good results. The silver halide grains can be regular and can be any suitable shape such as cubic or octahedral, as described and claimed in Illingsworth U.S. patent application Ser. No. 609,778 filed Jan. 17, 1967 now abandoned, and continuation-in-part 619,909 filed Mar. 2, 1967 and titled "Direct Positive Photographic Emulsion I." Such grains advantageously have a rather uniform diameter frequency distribution, as described and claimed in Illingsworth U.S. patent application Ser. No. 609,790 filed Jan. 17, 1967 now abandoned, and continuation-in-part Ser. No. 619,948 filed Mar. 2, 1967 and titled "Photographic Reversal Emulsions II." For example, at least 95%, by weight, of the photographic silver halide grains can have a diameter which is within about 40%, preferably within about 30% of the mean grain diameter. Mean grain diameter, i.e., average grain size, can be determined using conventional methods, e.g., as shown in an article by Trivelli and Smith entitled "Empirical Relations Between Sensitometric and Size-Frequency Characteristics in Photographic Emulsion Series" in The Photographic Journal, vol. LXXIX, 1949, pages 330–338. The fogged silver halide grains in these direct-positive photographic emulsions of this invention produce a density of at least 0.5 when developed without exposure for five minutes at 68° F. in Kodak DK–50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about ten mole percent iodide. The photographic silver halides can be coated at silver coverages in the range of about 50 to about 500 milligrams of silver per square foot of support.

In the preparation of the above photographic emulsions, the *halogenated* dyes of the invention are advantageously incorporated in the washed, finished silver halide emulsion and should, of course, be uniformly distributed throughout the emulsion. The methods of incorporating *halogenated* dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new *halogenated* dyes include any of those prepared with hydrophilic colloids that are known to be satisfactory for dispersing silver halides, for example, emulsions comprising natural materials such as gelatin, albumin, agar-agar, gum arabic, alginic acid, etc, and hydrophilic synthetic resins such as polyvinyl alcohol, polyvinyl pyrrolidone, cellulose ethers, partially hydrolyzed cellulose acetate, and the like.

The *halogenated* dyes, reducing agents and metal compounds of the invention can be used with emulsions prepared, as indicated above, any of the light-sensitive silver halide salts including silver chloride, silver bromide, silver chlorobromide, silver bromoiodide, silver chlorobromoiodide, etc. Particularly useful for direct positive fogged emulsions in which the silver salt is a silver bromohalide comprising more than 50 mole percent bromide. The *halogenated* dyes of this invention are also useful in emulsions which contain color formers.

The novel emulsions of this invention may be coated on any suitable photographic support, such as glass, film base such as cellulose acetate, cellulose acetate butyrate, polyesters such as polyethylene terephthalate, paper, baryta coated paper, polyolefin coated paper, e.g., polyethylene or polypropylene coated paper, which may be electron bombarded to promote emulsion adhesion, to produce the novel photographic elements of the invention.

This invention will be further illustrated by the following examples. Examples 1 and 2 show preparation of direct positive emulsions by light fogging and adding the special electron acceptors of the invention.

Example 1

To 40 ml. of solution of ethyl alcohol containing $5\times10^{-6}$ grams of the sensitizing dye, 1,1'-diethyl-2,2'-cyanine chloride is added 20 ml. of an aqueous solution containing $2\times10^{-4}$ grams of a bromine-pyrrolidone complex sold by the General Aniline and Film Corp. The mixture of these two solutions results in the conversion of the previously red colored solution by the dye (absorption max—540 mμ) to a blue colored solution (absorption max—590 mμ). The blue form of the dye is light sensitive and should be prepared and used only in total darkness to prevent spontaneous decomposition. To evaluate the direct positive producing property of [this blue form of] the *halogenated* dye on a gelatino silver halide emulsion, a silver chlorobromide emulsion (halide content: 60 mole percent bromide, 40 mole percent chloride) was coated on a support at 250 mg. per square foot silver and 500 mg. per square foot gelatin. This film was exposed through a step wedge and immersed in the solution prepared as the above described blue dye for 2 minutes. After drying the layer in the dark, a second exposure was given. The emulsion was immersed for 1 minute in Kodak developer D–72 at 20° C. and fixed. In the areas of the emulsion which received the second exposure, the effect of the first exposure was removed. When the emulsion was uniformly fogged before the dye treatment, a direct positive image was obtained with the second exposure. The emulsion was sensitive to radiation of 480 to 600 mμ with maximum sensitivity at 590 mμ. No reversal images were obtained when the unbrominated dye was employed in ethyl alcohol solution, or when the bromine-pyrrolidone complex was employed in the ethanol solution.

EXAMPLE 2

The film of Example 1 is exposed and processed as in Example 1 except that the dye employed is 1',3-diethylthia-2'-cyanine iodide (it is halogenated in the same manner as in Example 1). Similar results are obtained.

A series of halogenated dyes were prepared by the dropwise addition of a solution of 8 mg. N-bromosuccinimide (NBS) per ml. methanol to a methanolic solution of cyanine dye (8 mg. dye in 15 cc. methanol), until no further color change occurred. [At least one hydrogen atom in the methine chain of the dye is replaced with a bromine atom.] The dyes used are listed below, together with the number of equivalents NBS employed:

(A) 1,1',3,3'-tetramethyl-2,2'-cyanine iodide, 2 NBS
(B) 3,3'-diethylthiacyanine iodide, 2 NBS
(C) 3,3'-diethylthiacarbocyanine iodide, excess NBS
(D) 3,3'-diethylthiadicarbocyanine iodide, excess NBS
(E) 3,3'-diethylthiatricarbocyanine iodide, excess NBS
(F) 3,3'-diethyl-9-methylthiacarbocyanine bromide, excess NBS
(G) 9-ethyl-3,3'-dimethyl-4,5,4',5'-dibenzothiacarbocyanine chloride, excess NBS
(H) 1,1'-diethyl-2,2'-cyanine chloride, 2 NBS
(K) 3,3'-dimethylthiacyanine bromide, 1 NBS
(M) 3-bromo-1,1'-diethyl-2,2'-cyanine iodide, 3 NBS
(N) 1,1'-dimethyl-2,2'-cyanine iodide, 3 NBS (the carbon atoms joining the two quinoline rings of this dye carry two bromine atoms)
(O) 1-ethyl-1'-methyl-2,2'-cyanine iodide, 3 NBS
(P) 1',3-dimethylthia-2'-cyanine iodide, 2 NBS
(Q) 1'-ethyl-2-methylthia-2'-cyanine iodide, 2 NBS
(R) 1'-methyl-3-ethylthia-2'-cyanine iodide, 2 NBS
(S) 1',3-diethylthia-2'-cyanine iodide, 2 NBS
(T) 3-ethyl-3'-methylthiacyanine iodide, 2 NBS Other dyes used for comparison purposes in the following examples, are listed below.

(I) 1,1',3,3'-tetramethyl-2,2'-cyanine iodide
(II) 3,3'-diethylthiacyanine iodide
(III) 3,3'-diethylthiacarbocyanine iodide
(IV) 3,3'-diethylthiadicarbocyanine iodide
(V) 3,3'-diethylthiatricarbocyanine iodide
(VI) 3,3'-diethyl-9-methylthiacarbocyanine bromide
(VII) 9-ethyl-3,3'-dimethyl-4,5,4',5'-dibenzothiacarbocyanine chloride
(VIII) 1,1'-diethyl-2,2'-cyanine chloride
(IX) Anhydro-9-ethyl-3,3'-di(3-sulfopropyl)-4,5,4',5'-dibenzothiacarbocyanine hydroxide, sodium salt
(X) 3,3'-dimethyl-8,10-di(m-toloxy)thiacarbocyanine bromide
(XI) 1',3-diethylthia-2'-cyanine iodide
(XII) 4-[(1-ethyl-2(1H)-β-naphthothiazolylidene)isopropylidene]-3-methyl-1-(P-sulfophenyl)-5-pyrazolone
(XIII) Anhydro-9-ethyl-5,5'-diphenyl-3,3'-di(3-sulfobutyl)-oxacarbocyanine hydroxide, monosodium salt
(XIV) Anhydro-5,5',6,6'-tetrachloro-1,1'-diethyl-3,3'-di(3-sulfobutyl)benzimidazolocarbocyanine hydroxide
(J) 5-m-nitrobenzylidenerhodanine
(L) Phenosafranin.

The following examples illustrate the use of halogenated cyanine dyes in chemically fogged emulsions. In these examples, the concentration of the halogenated dye is based on the weight of the dye before reaction with NBS. Example 3 shows that direct positive images are obtained with fogged emulsions containing halogenated cyanine dyes, but not with the corresponding cyanine dyes which have not been halogenated.

Example 3

A gelatin silver bromide emulsion was reduction-gold fogged by first adding 0.2 mg. of thiourea dioxide per mole of silver and heating for 60 minutes at 60° C. and then adding 0.4 mg. of potassium chloroaurate per mole of silver and heating for 60 minutes at 65° C. The emulsion was melted at 40° C. and split into portions to which the following electron acceptors or brominated dyes dissolved in appropriate solvents were added. The emulsions were coated on cellulose acetate film support (silver coverage 257 mg. per square foot; gelatin coverage 392 mg. per square foot), chill-set and dried. The films were exposed on an Eastman sensitometer type 1B to light from a tungsten source modulated by a continuous wedge, developed for 5 minutes in Kodak developer DK-50 at 20° C., fixed, washed and dried. The following results were obtained:

| Brominated Dye (conc. g./mole of silver halide) | Density in unexposed area | Minimum density in exposed area |
|---|---|---|
| A (0.2) | 0.92 | 0.1 |
| B (0.2) | 0.82 | 0.06 |
| C (0.2) | 0.79 | 0.12 |
| D (0.2) | 0.5 | 0.26 |
| E (0.2) | 0.7 | 0.09 |
| F (0.2) | 0.3 | 0.12 |
| G (0.2) | 0.36 | 0.14 |
| H (0.2) | 1.26 | 0.06 |

| Dye (conc. g./mole silver halide): | Description of results |
|---|---|
| I (0.2) | No reversal-negative image. |
| II (0.2 | Do. |
| III (0.2) | Do. |
| IV (0.2) | Do. |
| V (0.2) | Do. |
| VI (0.2) | Do. |
| VII (0.2) | Do. |
| VIII (0.2) | Do. |
| Unsensitized control | Do. |

The inactivity of N-bromosuccinimide in gelatino silver halide emulsions fogged, exposed and processed as in Example 3 described above is shown below.

| Type of emulsion | Addendum (conc. g./mole silver halide) | Description of results |
|---|---|---|
| Bromide | None | No reversal, negative image only. |
| Do | N-bromosuccinimide (.098) | Do. |
| Do | N-bromosuccinimide (.196) | Do. |
| Chlorobromide | None | Do. |
| Do | N-bromosuccinimide (.4) | Do. |

Example 4 establishes that fogged direct positive emulsions containing the halogenated dyes of the invention may be spectrally sensitized with a suitable spectral sensitizing dye.

Example 4

The following data were obtained in the manner described in Example 3, except that, where indicated, a sensitizing dye was added to the liquid emulsion, by itself or with an electron acceptor. A Kodak-Wratten No. 16 filter was used as a measure of the spectral sensitization. Comparison of the data for the spectrally sensitized emulsions illustrates the superiority of the brominated dyes as electron acceptors.

| Election acceptor (conc. g./mole silver halide) | Sensitizing dye (conc. g./mole silver halide) | Density in unexposed area | Wratten No. 16 filter min. den. in exposed area |
|---|---|---|---|
| None | None | 1.16 | No reversal. |
| Do | IX (0.2) | 0.88 | Do. |
| Do | X (0.2) | 0.70 | Do. |
| Do | VIII (.0875)+XI (.0875)+XII (.025). | 0.83 | Do. |
| Do | XIII (0.1)+XIV (0.1) | 1.07 | Do. |
| J (0.1) | None | 0.89 | Do. |
| K (0.2) | do | 0.9 | Do. |
| J (0.2) | IX (0.2) | 0.74 | Do. |
| K (0.2) | IX (0.2) | 0.82 | 0.16. |
| J (0.2) | X (0.2) | 0.49 | 0.21. |
| K (0.2) | X (0.2) | 0.70 | 0.19. |
| J (0.2) | VIII (.0875)+XI (.0875)+XII (.025). | 0.66 | 0.29. |
| K (0.2) | VIII (.0875)+XI (.0875)+XII (.025). | 0.96 | 0.24. |
| J (0.2) | XIII (0.1)+XIV (0.1) | 0.69 | No reversal. |
| K (0.2) | XIII (0.1)+XIV (0.1) | 0.73 | 0.37. |

Example 5 shows the use of various electron acceptors featured in this invention in a fogged silver chlorobromide emulsion.

Example 5

The following data were obtained in the manner described in Example 3, except that the gelatin silver chlorobromide emulsion described in Example 1 was used, and the films were developed for 6 minutes in Kodak developer D-19 at 20° C. and fixed.

Comparison of the data for electron acceptors J and L with those from brominated sensitizing dyes M through T, K, C and H illustrate the superiority of the latter in the system.

| Electron acceptor (conc. g./mole silver halide) | Density in exposed areas | Minimum density in exposed areas (no filter) | Description of response in areas of high exposure level |
|---|---|---|---|
| None | | (See below) | |
| J (0.2) | 0.85 | 0.62 | Negative image. |
| J (0.1) | 1.07 | 0.51 | Do. |
| L (0.2) | 1.65 | 0.78 | Do. |
| H (0.2) | 1.03 | 0.07 | Minimum density. |
| M (0.2) | 1.11 | 0.08 | Do. |
| N (0.2) | 0.88 | 0.08 | Do. |
| O (0.2) | 0.89 | 0.08 | Do. |
| P (0.2) | 0.77 | 0.12 | Do. |
| Q (0.2) | 0.70 | 0.21 | Do. |
| R (0.2) | 0.63 | 0.11 | Do. |
| S (0.2) | 0.75 | 0.14 | Do. |
| K (0.2) | 1.49 | 0.16 | Do. |
| T (0.2) | 1.00 | 0.08 | Do. |
| C (0.2) | 1.38 | 0.52 | Do. |

The control shows an increase in density with exposure (negative image) which goes through a maximum and then decreases (solarization). The emulsions of the invention initially show a decrease in density with exposure. The reversal obtained at high exposure levels with prior art electron acceptors J and L does not occur with the brominated dyes of the invention.

Example 6

The following data were obtained as in Example 3, but using Kodak developer D–19. This example illustrates the superiority of brominated dyes in a coarse-grain, gelatin silver bromide, reduction- and gold-sensitized emulsion.

| Electron acceptor (conc. g./mole silver halide) | Relative clear speed (1.0 above min. density) | $\gamma$ | Minimum density |
|---|---|---|---|
| L (0.2) | 100 | 2.16 | 0.12 |
| H (0.1) | 276 | 2.5 | 0.04 |
| K (0.1) | 162 | 2.76 | 0.06 |

Example 7 illustrates direct positive emulsions in which the silver halide grain has a water-insoluble silver salt center and an outer shell composed of a fogged water insoluble silver salt that develops to silver without exposure, which emulsion features a halogenated dye in accordance with the invention. Example 7 also shows the preparation of such emulsions.

Example 7

Silver nitrate and solution chloride solutions were run into a solution of gelatin for 20 minutes at 70° C. The emulsion was cooled and 0.2 g. of potassium chloroiridite per silver mole was added. The emulsion was reheated to 70° C., and more silver nitrate and sodium chloride were run in for 20 minutes. The emulsion was cooled to 40° C. and fogged by adding 4.0 mg. thiourea dioxide (used to fog the surface of the emulsion grains) and 4.0 ml. of 2.5 N sodium hydroxide per mole of silver. The emulsion was acidified and gelatin added to bring the total to 160 g. of gelatin per mole of silver. It was then spectrally sensitized by adding 200 mg. of Dye Z per mole of silver. To a portion of the emulsion was added 100 mg. of N per mole of silver. The emulsions were coated on a cellulose acetate film support at a coverage of 120 mg. silver per square foot, exposed on an Eastman IB sensitometer, and processed for 1½ minutes in a developer having the following composition:

| | G. |
|---|---|
| N-methyl-p-aminophenol sulfate | 3.0 |
| Sodium sulfite (anhydrous) | 45.0 |
| Hydroquinone | 12.0 |
| Sodium carbonate monohydrate | 80.0 |
| Potassium bromide | 2.0 |
| Water to make two liters. | |

| Feature | Relative speed | $D_{max.}$ | $D_{min.}$ |
|---|---|---|---|
| 200 mg. Z/mole silver | 100 | 1.20 | 0.04 |
| 200 mg. Z/mole silver plus 100 mg. N/mole silver | 289 | 1.22 | 0.05 |

Example 8

Coatings were prepared as in Example 7, except that no potassium chloroiridite was added during precipitation of the emulsion. These results also show the advantage gained by using a brominated dye in combination with a sensitizing dye.

| Feature | Relative speed | $D_{max.}$ | $D_{min.}$ |
|---|---|---|---|
| 200 mg. Z/mole silver | 100 | 0.66 | 0.04 |
| 200 mg. Z/mole silver plus 100 mg. N/mole silver | 6,310 | 0.64 | 0.04 |

In Examples 7 and 8, dye Z refers to 3-carboxymethyl-5 - [(3-methyl-2-thiazolidinylidene)-1-methylethylidene] rhodanine.

Other methods for preparing emulsions of the type used in Examples 7 and 8 are disclosed and claimed in Berriman U. S. patent application No. 448,467, filed Apr. 15, 1965, referred to above.

The emulsions of this invention may be dispersed in any photographic hydrophilic colloid, such as any of those referred to in U.S. Patent 3,039,873, column 13, and may contain any of the hardeners or plasticizers referred to in columns 12 and 13 of that patent.

Although the invention has been described in consilerable detail with particular reference to certain preferred embodiments thereof, it will be understood that variations and modifications can be effected within the spirit and scope of the invention as described hereinabove, and as defined in the appended claims.

We claim:

[1. A fogged direct positive silver halide emulsion containing, as electron acceptor, a halogenated cyanine dye having at least one terminal methine group wherein the hydrogen atom thereof is replaced with a halogen atom selected from the group consisting of chlorine, bromine and iodine atoms.

[2. A fogged direct positive silver halide emulsion containing, as electron acceptor, a cyanine dye having the following general formula:

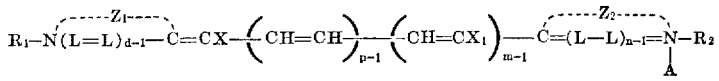

wherein $Z_1$ and $Z_2$ each represents the non-metallic atoms necesary to complete a heterocyclic nucleus containing from 5 to 6 atoms; L represents a methine group; X and $X_1$ each represents an atom selected from the group consisting of hydrogen, chlorine, bromine and iodine atoms, at least one of X and $X_1$ being selected from the group consisting of chlorine, bromine and iodine; $R_1$ and $R_2$ each represents an alkyl substituent; A represents an anion; and d, m, n, and p each represents a positive integer of from 1 to 2.]

3. A direct positive emulsion in accordance with claim [1] *23* wherein said emulsion is light-fogged and the cyanine dye is a simple cyanine.

4. A direct positive emulsion in accordance with claim [1] *23* wherein the emulsion is chemically fogged with a reducing agent.

5. A direct positive emulsion in accordance with claim [1] *23* wherein said emulsion is sensitized to radiation having wave lengths longer than about 480 mμ, with a photographic spectral sensitizing dye.

6. A direct positive emulsion in accordance with claim [2] *23* wherein said emulsion comprises grains having a central core of a water-insoluble silver salt containing centers which promote the deposition of photolytic silver, and an outer shell covering said core comprising a fogged water-insoluble silver salt that develops to silver without exposure.

7. A direct positive emulsion in accordance with claim [2] *23* wherein said emulsion is fogged with a reducing agent and a compound of a metal more electropositive than silver.

[8. A photographic emulsion in accordance with claim 2 wherein said dye is 1,1',3,3'-tetramethyl-2,2'-cyanine iodide wherein at least one of the hydrogen atoms of the methine chain thereof is replaced with a bromine atom.]

[9. A photographic emulsion in accordance with claim 2 wherein said dye is 3,3'-diethylthiacyanine iodide wherein at least one of the hydrogen atoms of the methine chain thereof is replaced with a bromine atom.]

[10. A photographic emulsion in accordance with claim 2 wherein said dye is 3,3'-diethylthiacarbocyanine iodide wherein at least one of the hydrogen atoms of the methine chain thereof is replaced with a bromine atom.]

[11. A photographic emulsion in accordance with claim 2 wherein said dye is 3,3'-diethylthiadicarbocyanine iodide wherein at least one of the hydrogen atoms of the methine chain thereof is replaced with a bromine atom.]

[12. A photographic emulsion in accordance with claim 2 wherein said dye is 9-ethyl-3,3'-dimethyl-4,5,4',5'-dibenzothiacarbocyanine chloride wherein at least one of the hydrogen atoms of the methine chain thereof is replaced with a bromine atom.]

[13. A photographic emulsion in accordance with claim 2 wherein said dye is 1'-methyl-3-ethylthia-2'-cyanine iodide wherein at least one of the hydrogen atoms of the methine chain thereof is replaced with a bromine atom.]

[14. A photographic emulsion in accordance with claim 2 wherein said dye is 1,1'-diethyl-2,2'-cyanine salt wherein the carbon atom joining the two quinoline rings of said dye carries two bromine atoms.]

15. A direct positive, photographic emulsion in accordance with claim [1] *21* which comprises fogged silver halide grains, said grains being such that a test portion thereof, when coated as a photographic silver halide emulsion on a support to give a maximum density of at least about 1 upon processing for 6 minutes at about 68° F. in Kodak DK–50 developer, has a maximum density which is at least about 30% greater than the maximum density of an identical coated test portion which is processed for 6 minutes at about 68° F. in Kodak DK–50 developer after being bleached for about 10 minutes at about 68° F. in a bleach composition of:

| | | |
|---|---|---|
| Potassium cyanide | mg | 50 |
| Acetic acid (glacial) | cc | 3.47 |
| Sodium acetate | g | 11.49 |
| Potassium bromide | mg | 119 |
| Water to 1 liter. | | |

16. A direct positive, photographic emulsion in accordance with claim [1] *21* which comprises fogged silver halide grains, at least 95%, by weight, of said grains having a size which is within about 40% of the mean grain size.

17. A direct positive, photographic emulsion in accordance with claim [2] *23* which comprises fogged silver halide grains, said grains being such that a test portion thereof, when coateed as a photographic silver halide emulsion on a support to give a maximum density of at least about 1 upon processing for 6 minutes at about 68° F. in Kodak DK–50 developer, has a maximum density of an identical coated test portion which is processed for 6 minutes at about 68° F. in Kodak DK–50 developer after being bleached for about 10 minutes at about 68° F. in a bleach composition of:

| | | |
|---|---|---|
| Potassium cyanide | mg | 50 |
| Acetic acid (glacial) | cc | 3.47 |
| Sodium acetate | g | 11.49 |
| Potassium bromide | mg | 119 |
| Water to 1 liter. | | |

18. A direct positive, photographic emulsion in accordance with claim [2] *23* which comprises fogged silver halide grains, at least 95%, by weight, of said grains having a size which is within about 40% of the mean grain size.

[19. A fogged direct positive silver halide emulsion containing, as electron acceptor, a simple cyanine dye in which the carbon atom joining the nuclei of said dye carries two halogen atoms selected from the group consisting of chlorine, bromine and iodine atoms.]

[20. A fogged direct positive silver halide emulsion containing, as electron acceptor, a simple cyanine dye in which the carbon atom joining the nuclei of said dye carries two bromine atoms.]

*21. A fogged direct positive silver halide emulsion containing, as electron acceptor, a cyanine dye derivative in which at least one terminal methine group of the parent cyanine dye is halogenated with chlorine, bromine or iodine.*

*22. A fogged direct positive silver halide emulsion containing, as electron acceptor, a cyanine dye derivative in which at least one terminal methine group of the parent cyanine dye is halogenated with chlorine or bromine.*

*23. A fogged direct positive silver halide emulsion containing, as electron acceptor, a cyanine dye derivative in which at least one terminal methine group of the parent cyanine dye is halogenated with bromine.*

*24. A fogged direct positive silver halide emulsion containing, as electron acceptor, a simple cyanine dye derivative in which the methine group of the parent cyanine dye is brominated.*

*25. A fogged direct positive emulsion as defined in claim 23 wherein said cyanine dye is 1,1',3,3'-tetramethyl-2,2'-cyanine iodide.*

*26. A fogged direct positive emulsion as defined in claim 23 wherein said cyanine dye is 3,3'-diethylthiacyanine iodide.*

*27. A fogged direct positive emulsion as defined in claim 23 wherein said cyanine dye is 3,3'-diethylthiacarbocyanine iodide.*

*28. A fogged direct positive emulsion as defined in claim 23 wherein said cyanine dye is 3,3'-diethylthiadicarbocyanine iodide.*

*29. A fogged direct positive emulsion as defined in claim 23 wherein said cyanine dye is 9-ethyl-3,3'-dimethyl-4,5,4',5'-dibenzothiacarbocyanine chloride.*

*30. A fogged direct positive emulsion as defined in claim 23 wherein said cyanine dye is 1'-methyl-3-ethylthia-2'-cyanine iodide.*

*31. A fogged direct positive silver halide emulsion containing, as electron acceptor, a 1,1'-di(lower)alkyl-2,2'-cyanine dye derivative in which the methine group of said dye is brominated.*

*32. A fogged direct positive photographic silver halide emulsion containing, as electron acceptor, the reaction product of a brominating agent with a cyanine dye selected from the group consisting of:*

*1,1',3,3'-tetramethyl-2,2'-cyanine*
*3,3'-diethylthiacyanine*
*3,3'-diethylthiacarbocyanine*

*3,3'-diethylthiadicarbocyanine*
*3,3'-diethylthiatricarbocyanine*
*3,3'-diethyl-9-methylthiacarbocyanine*
*9-ethyl-3,3'-dimethyl-4,5,4',5'-dibenzothiacarbocyanine*
*1,1'-diethyl-2,2'-cyanine*
*3,3'-dimethylthiacyanine*
*3-bromo-1,1'-diethyl-2,2'-cyanine*
*1-ethyl-1'-methyl-2,2'-cyanine*
*1',3-dimethylthia-2'-cyanine*
*1'-ethyl-2-methylthia-2'-cyanine*
*1'-methyl-3-ethylthia-2'-cyanine*
*1',3-diethylthia-2'-cyanine and*
*3-ethyl-3'-methylthiacyanine.*

*33. A fogged direct positive photographic silver halide emulsion containing, as electron acceptor, the reaction product of a 1,1'-diethyl-2,2'-cyanine salt with N-bromosuccinimide.*

*34. A fogged direct positive silver halide emulsion containing, as electron acceptor, the reaction product of a cyanine dye with a brominating agent or a chlorinating agent.*

*35. A fogged direct positive silver halide emulsion con-*

*taining, as electron acceptor, the reaction product of a cyanine dye with a brominating agent.*

References Cited

The following references, cited by the Examiner, are of record in the patented file of this patent or the original patent.

UNITED STATES PATENTS

| | | | |
|---|---|---|---|
| 3,531,290 | 9/1970 | Litzerman | 96—108 |
| 3,531,288 | 9/1970 | Jones | 96—108 |
| 2,111,183 | 3/1938 | Heilbron et al. | 96—106 X |
| 2,930,694 | 3/1960 | Coenen et al. | 96—105 X |
| 3,367,778 | 2/1968 | Berriman | 96—64 |

FOREIGN PATENTS

| | | |
|---|---|---|
| 723,019 | 2/1953 | Great Britain. |

DAVID KLEIN, Primary Examiner

J. L. GOODROW, Assistant Examiner

U.S. Cl. X.R.

96—107, 108